(12) United States Patent
Fujishiro

(10) Patent No.: US 11,277,769 B2
(45) Date of Patent: Mar. 15, 2022

(54) COMMUNICATION METHOD, RADIO COMMUNICATION APPARATUS, AND PROCESSOR

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/766,507

(22) PCT Filed: Nov. 19, 2018

(86) PCT No.: PCT/JP2018/042679
§ 371 (c)(1),
(2) Date: May 22, 2020

(87) PCT Pub. No.: WO2019/102965
PCT Pub. Date: May 31, 2019

(65) Prior Publication Data
US 2020/0382994 A1    Dec. 3, 2020

(30) Foreign Application Priority Data

Nov. 22, 2017  (JP) .............................. JP2017-225214

(51) Int. Cl.
*H04W 28/04* (2009.01)
*H04L 1/16* (2006.01)
(Continued)

(52) U.S. Cl.
CPC ........... *H04W 28/04* (2013.01); *H04L 1/1642* (2013.01); *H04L 1/22* (2013.01); *H04L 5/0055* (2013.01); *H04W 80/08* (2013.01)

(58) Field of Classification Search
CPC ........ H04W 28/04; H04L 1/1642; H04L 1/22; H04L 5/0055
See application file for complete search history.

(56) References Cited

U.S. PATENT DOCUMENTS

2008/0049754 A1\*  2/2008  Kim .................... H04L 1/165
                                                  370/394
2009/0016301 A1\*  1/2009  Sammour ............ H04L 69/04
                                                  370/331
(Continued)

OTHER PUBLICATIONS

Huawei, Hisilicon; RLC optimization for packet duplication; 3GPP TSG RAN WG2 #99; R2-1709498; Aug. 21-25, 2017; total 4 pages; Berlin, Germany.
(Continued)

*Primary Examiner* — Fahmida S Chowdhury
(74) *Attorney, Agent, or Firm* — Studebaker & Brackett PC

(57) ABSTRACT

A communication method for controlling a first radio communication apparatus and a second radio communication apparatus. The first radio communication apparatus to include a first transmitting radio link control (RLC) entity which is a primary RLC entity, a second transmitting RLC entity which is an additional RLC entity, and a transmitting packet data convergence protocol (PDCP) entity to send an identical packet to both the first transmitting RLC entity and the second transmitting RLC entity. The second radio communication apparatus to include a first receiving RLC entity which is a primary RLC entity to receive a packet from the first transmitting RLC entity, a second receiving RLC entity which is an additional RLC entity to receive a packet from the second transmitting RLC entity, and a receiving PDCP entity to receive packets from both the first receiving RLC entity and the second receiving RLC entity.

12 Claims, 11 Drawing Sheets

(51) Int. Cl.
   *H04L 1/22*      (2006.01)
   *H04L 5/00*      (2006.01)
   *H04W 80/08*     (2009.01)

(56) References Cited

U.S. PATENT DOCUMENTS

| | | | |
|---|---|---|---|
| 2010/0215020 A1* | 8/2010 | Lee | H04L 1/1841 |
| | | | 370/331 |
| 2015/0092676 A1* | 4/2015 | Periyalwar | H04W 4/18 |
| | | | 370/329 |
| 2016/0029427 A1* | 1/2016 | Zhong | H04L 1/1893 |
| | | | 370/329 |
| 2016/0183158 A1* | 6/2016 | Decarreau | H04W 28/0205 |
| | | | 370/328 |
| 2016/0234714 A1* | 8/2016 | Basu Mallick | H04W 28/085 |
| 2016/0249232 A1* | 8/2016 | Uchino | H04L 1/1832 |
| 2016/0338092 A1 | 11/2016 | Agiwal et al. | |
| 2017/0111946 A1* | 4/2017 | Cheng | H04W 76/14 |

OTHER PUBLICATIONS

Huawei, Asustek, Hisilicon; PDCP operation for packet duplication; 3GPP TSG RAN WG2 #99bis; R2-1710763, Oct. 9-13, 2017; total 9 pages; Prague, Czech Republic.

3GPP Technical specification; LTE; Evolved Universal Terrestrial Radio Access (E-UTRA) and Evolved Universal Terrestrial Radio Access Network (E-UTRAN); Overall description; Stage 2; 3GPP TS 36.300 VI4.4.0 Release 14; Oct. 2017; pp. 1-348; Sophia Antipolis Cedex, France.

\* cited by examiner

COMMUNICATION METHOD, RADIO COMMUNICATION APPARATUS, AND PROCESSOR

TECHNICAL FIELD

The present disclosure relates to a communication method, a radio communication apparatus, and a processor.

BACKGROUND ART

In the specifications formulated according to the 3rd Generation Partnership Project (3GPP) that is a mobile communication system standardization project, an RLC entity and a PDCP entity are defined (see Non patent Literature 1).

The RLC entity executes packet segmentation, concatenation, and assembly. The PDCP entity executes header compression/decompression and encryption (ciphering)/decryption (deciphering).

CITATION LIST

Non Patent Literature

Non patent Literature 1: 3GPP Technical specification "TS36.300 V14.4.0" in Sep. 25, 2017

SUMMARY OF INVENTION

A communication method according to one embodiment is a communication method for controlling a first radio communication apparatus and a second radio communication apparatus. The first radio communication apparatus configured to include a first transmitting radio link control (RLC) entity which is a primary RLC entity, a second transmitting RLC entity which is an additional RLC entity, and a transmitting packet data convergence protocol (PDCP) entity configured to send an identical packet to both the first transmitting RLC entity and the second transmitting RLC entity. The second radio communication apparatus configured to include a first receiving RLC entity which is a primary RLC entity configured to receive a packet from the first transmitting RLC entity, a second receiving RLC entity which is an additional RLC entity configured to receive a packet from the second transmitting RLC entity, and a receiving PDCP entity configured to receive packets from both the first receiving RLC entity which is the primary RLC entity and the second receiving RLC entity which is the additional RLC entity. The communication method comprises a step of sending, from the receiving PDCP entity to the first receiving RLC entity which is the primary RLC entity, information indicating a packet reception status at the receiving PDCP entity.

A radio communication apparatus according to one embodiment comprises a controller. The controller is configured to execute a process of controlling a first receiving radio link control (RLC) entity which is a primary RLC entity configured to receive a packet from a first transmitting RLC entity of other radio communication apparatus, a second receiving RLC entity which is an additional RLC entity configured to receive a packet from a second transmitting RLC entity of the other radio communication apparatus, and a receiving PDCP entity configured to receive packets from both the first receiving RLC entity which is the primary RLC entity and the second receiving RLC entity which is the additional RLC entity. The controller is configured to execute a process of sending, from the receiving PDCP entity to the first receiving RLC entity which is the primary RLC entity, information indicating a packet reception status at the receiving PDCP entity.

A processor according to one embodiment is a processor for control of a radio communication apparatus. The processor configured to execute a process of controlling a first receiving radio link control (RLC) entity which is a primary RLC entity configured to receive a packet from a first transmitting RLC entity of other radio communication apparatus, a second receiving RLC entity which is an additional RLC entity configured to receive a packet from a second transmitting RLC entity of the other radio communication apparatus, and a receiving PDCP entity configured to receive packets from both the first receiving RLC entity which is the primary RLC entity and the second receiving RLC entity which is the additional RLC entity. The processor configured to execute a process of sending, from the receiving PDCP entity to the first receiving RLC entity which is the primary RLC entity, information indicating a packet reception status at the receiving PDCP entity.

DESCRIPTION OF EMBODIMENTS

Overview of Embodiment

Figure 1:
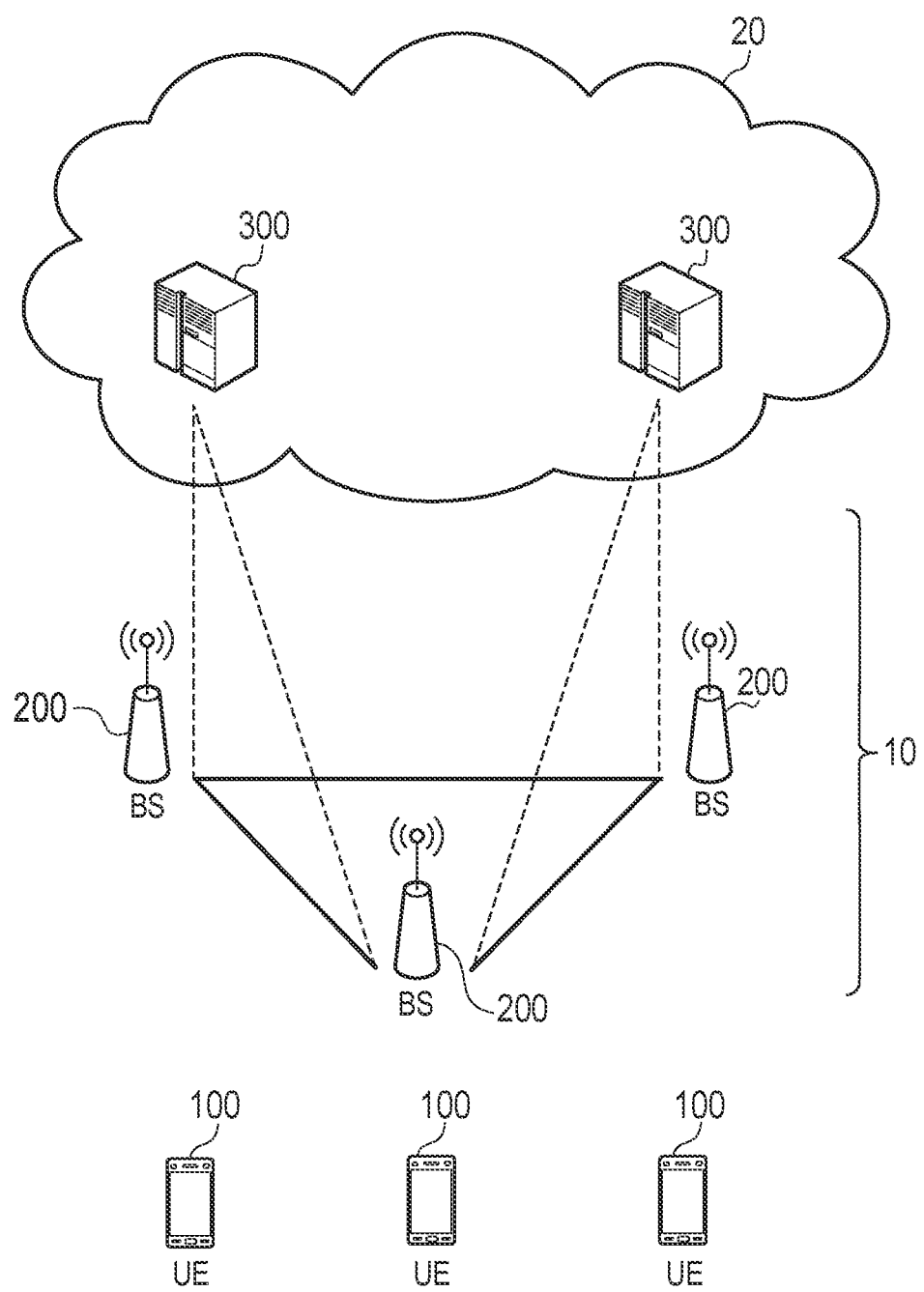
FIG. 1 is a diagram illustrating an architecture of a communication system.

In order to improve communication reliability, there is proposed a method in which one transmission-side PDCP entity (hereinafter referred to as the transmitting PDCP entity) sends the same packet to one reception-side PDCP entity (hereinafter, a receiving PDCP entity) through a first RLC entity and a second RLC entity on the transmission side and the reception side. The first transmitting RLC entity is a primary RLC entity, and radio link failure is triggered based on the number of packet retransmissions reaching a threshold. The second transmitting RLC entity is an additional RLC entity, and no radio link failure is triggered.

Since it is sufficient for the receiving PDCP entity to receive the packet, transmitted through the first and second RLC entities on the transmission side, from at least one of the first and second receiving RLC entities on the reception side, the communication reliability can be improved.

However, the first receiving RLC entity and the second receiving RLC entity are different entities. For this reason, when the first receiving RLC entity fails to receive a predetermined packet, there is a possibility that the radio link failure is triggered even if the receiving PDCP entity has received the predetermined packet from the second receiving RLC entity.

A communication method according to one embodiment is a communication method for controlling a first radio communication apparatus and a second radio communication apparatus. The first radio communication apparatus includes: a first transmitting radio link control (RLC) entity which is a primary RLC entity; a second transmitting RLC entity which is an additional RLC entity; and a transmitting packet data convergence protocol (PDCP) entity that sends the same packet to both the first transmitting RLC entity and the second transmitting RLC entity. The second radio communication apparatus includes: a first receiving RLC entity which is a primary RLC entity receiving a packet from the first transmitting RLC entity; a second receiving RLC entity which is an additional RLC entity receiving a packet from the second transmitting RLC entity; and a receiving PDCP entity that receives packets from both the first receiving RLC entity which is the primary RLC entity and the second receiving RLC entity which is the additional RLC entity. There is a step of sending information indicating a packet reception status at the receiving PDCP entity from the receiving PDCP entity to the first receiving RLC entity which is the primary RLC entity.

In the sending, the receiving PDCP entity may send the information indicating the reception status to the first receiving RLC entity which is the primary RLC entity whenever receiving a packet from each of the first receiving RLC entity which is the primary RLC entity and the second receiving RLC entity which is the additional RLC entity.

The information indicating the reception status may include a PDCP sequence number of a received packet.

The information indicating the reception status may include identification information to identify a transmission source of the packet received in the previous period.

The communication method may include a step of inquiring of the receiving PDCP entity about the packet reception status by the first receiving RLC entity which is the primary RLC entity. In the sending, the receiving PDCP entity may send the information indicating the reception status to the first receiving RLC entity which is the primary RLC entity in response to reception of the inquiry from the first receiving RLC entity which is the primary RLC entity.

In the inquiring, the first receiving RLC entity, which is the primary RLC entity, may inquire of the receiving PDCP entity about the packet reception status before the number of retransmissions in the first transmitting RLC entity reaches the threshold or in response to the number of retransmissions reaching the threshold.

The communication method may include: a step of monitoring a PDCP sequence number from a packet received from the first transmitting RLC entity by the first receiving RLC entity which is the primary RLC entity; and a step of storing the PDCP sequence number, monitored by the first receiving RLC entity which is the primary RLC entity, and an RLC sequence number of the received packet in association with each other.

In the sending, the receiving PDCP entity may send the information indicating the reception status to the first receiving RLC entity which is the primary RLC entity in response to reception of a packet that has not been received from the first receiving RLC entity, which is the primary RLC entity, from the second receiving RLC entity which is the additional RLC entity.

The first receiving RLC entity, which is the primary RLC entity, may consider a packet that has not been received from the first transmitting RLC entity as a received packet based on the information indicating the reception status.

The communication method may include a step of sending information indicating reception of a predetermined packet from the first receiving RLC entity, which is the primary RLC entity, to the first transmitting RLC entity as acknowledgement information for the predetermined packet that has not been received from the first transmitting RLC entity based on the information indicating the reception status.

The communication method may include a step of stopping sending information indicating non-reception of a predetermined packet from the first receiving RLC entity, which is the primary RLC entity, to the first transmitting RLC entity as acknowledgement information for the predetermined packet that has not been received from the first transmitting RLC entity based on the information indicating the reception status.

A radio communication apparatus according to one embodiment includes a controller. The controller is configured to execute: a process of controlling a first receiving radio link control (RLC) entity which is a primary RLC entity configured to receive a packet from a first transmitting RLC entity of other radio communication apparatus, a second receiving RLC entity which is an additional RLC entity configured to receive a packet from a second transmitting RLC entity of the other radio communication apparatus, and a receiving PDCP entity configured to receive packets from both the first receiving RLC entity which is the primary RLC entity and the second receiving RLC entity which is the additional RLC entity; and a process of sending information indicating a packet reception status at the receiving PDCP entity from the receiving PDCP entity to the first receiving RLC entity which is the primary RLC entity.

A processor according to one embodiment is a processor for control of a radio communication apparatus. The processor is configured to execute: a process of controlling a first receiving radio link control (RLC) entity which is a primary RLC entity configured to receive a packet from a first transmitting RLC entity of other radio communication apparatus, a second receiving RLC entity which is an additional RLC entity configured to receive a packet from a second transmitting RLC entity of the other radio communication apparatus, and a receiving PDCP entity configured to receive packets from both the first receiving RLC entity which is the primary RLC entity and the second receiving RLC entity which is the additional RLC entity; and a process of sending information indicating a packet reception status at the receiving PDCP entity from the receiving PDCP entity to the first receiving RLC entity which is the primary RLC entity.

Embodiment (Communication System)

Hereinafter, a communication system will be described. FIG. 1 is a diagram illustrating an architecture of a mobile communication system. An LTE system will be described as an example of the mobile communication system.

As illustrated in FIG. 1, the LTE system includes a user equipment (UE) 100, a radio access network (RAN) 10, and a core network 20.

The UE 100 corresponds to a radio communication apparatus (radio terminal). The UE 100 performs radio communication with a cell (BS 200 to be described later). An architecture of the UE 100 will be described later.

The UE 100 may be, for example, a portable radio communication apparatus such as a mobile phone (for example, a smartphone), a tablet, and a mobile personal computer. The UE 100 may be, for example, a communication apparatus (wearable terminal) that can be worn by a user, such as a watch, glasses, a wristband, and accessories. The UE 100 may be a communication apparatus provided on a vehicle (for example, an automobile, a motorcycle, a bicycle, a ship, an airplane, and the like) or a flying object (for example, a drone). The UE 100 may be a vehicle or a flying object itself equipped with a communication apparatus. The UE 100 may be a communication module that is detachable from a vehicle. The UE 100 may be a fixed radio communication apparatus.

The RAN 10 corresponds to a radio access network. The RAN 10 is, for example, an evolved universal terrestrial radio access network (E-UTRAN). The RAN 10 may be a next generation radio access network (NG-RAN).

The RAN 10 includes the base station (BS) 200. The BS 200 is a node configuring the RAN 10. The BS 200 corresponds to a (radio) base station. The BS 200 is, for example, an evolved Node-B (eNB) 200. The BS 200 may be a next generation evolved Node-B (ng-eNB). The BS 200 may be a next Generation Node-B (gNB).

The BS 200 may be a node capable of performing radio communication with the UE 100. Therefore, the BS 200 may be referred to as a radio communication apparatus. The BSs 200 may be connected to each other via a predetermined interface. An architecture of the BS 200 will be described later.

The BS 200 manages one or a plurality of cells. The BS 200 performs radio communication with the UE 100 that has established a connection with a cell managed by the BS 200. The BS 200 has a radio resource management (RRM) function, a routing function of user data (hereinafter, sometimes referred to as "data"), a measurement control function for mobility control and scheduling, and the like.

The "cell" is used as a term indicating the minimum unit of a radio communication area. The "cell" may also be used as a term indicating a function of performing radio communication with the UE 100. The "cell" may be a downlink resource. The "cell" may be a combination of a downlink resource and an uplink resource. A link between a carrier frequency of the downlink resource and a carrier frequency of the uplink resource may be included in system information transmitted on the downlink resource. The "cell" may be used as a term indicating a carrier and/or a frequency.

The core network 20 is, for example, an evolved packet core (EPC). The core network 20 includes a network apparatus 300. The network apparatus 300 is, for example, a mobility management entity (MME). The MME performs, for example, various types of mobility control with respect to the UE 100. The network apparatus 300 may be a serving gateway (SGW). The SGW performs, for example, data transfer control. The network apparatus (MME and/or SGW) 300 is connected to the BS 200 via a predetermined interface.

The core network 20 may be a 5G core network (5GC). The network apparatus 300 is, for example, an access and mobility management function (AMF). The AMF performs, for example, mobility management control. The network apparatus 300 may be a user plane function (UPF). The UPF has, for example, an anchor point function for intra- and/or inter-RAT mobility. The network apparatus (AMF and/or UPF) 300 is connected to the BS 200 via a predetermined interface.

Figure 2:
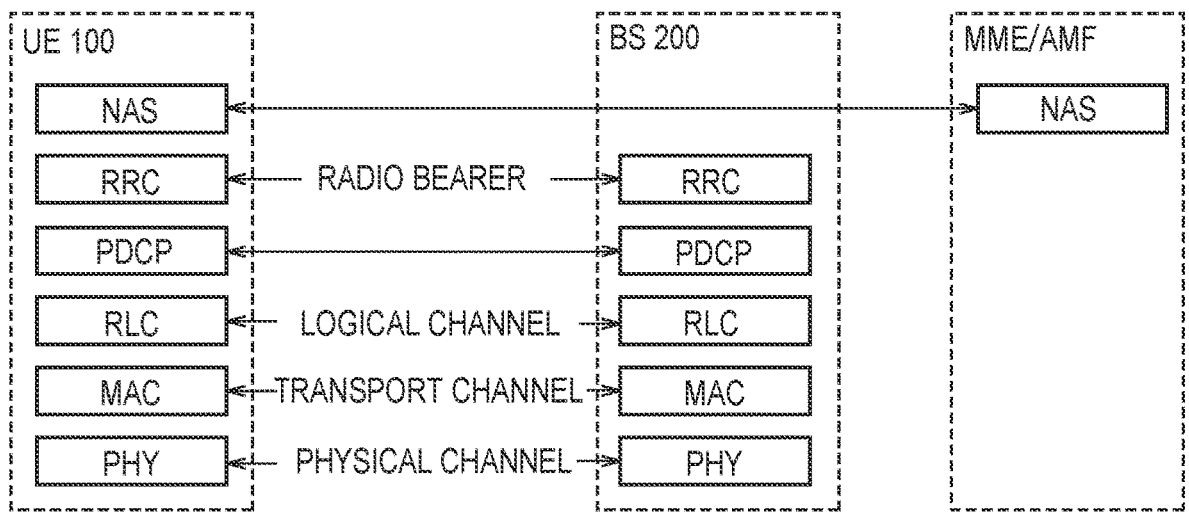
FIG. 2 is a protocol stack diagram of a radio interface (control plane).
Figure 3:
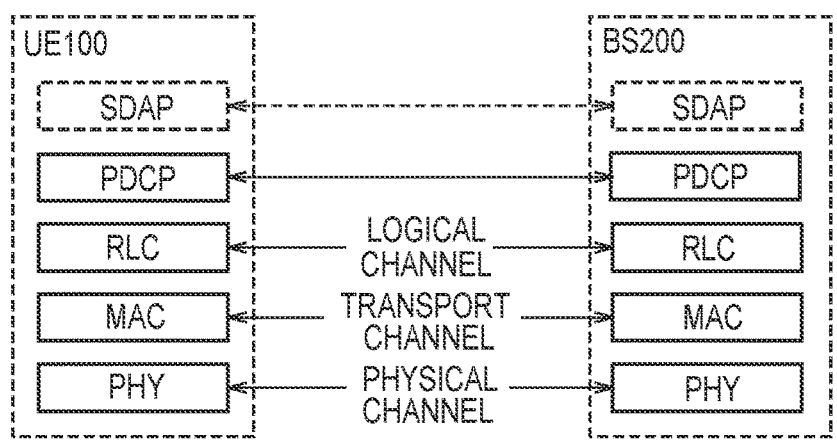
FIG. 3 is a protocol stack diagram of a radio interface (user plane).

FIG. 2 is a protocol stack diagram of a radio interface (control plane). FIG. 3 is a protocol stack diagram of a radio interface (user plane).

As illustrated in FIG. 2, a radio interface protocol is divided into a first layer to a third layer of an OSI reference model. The first layer is a physical (PHY) layer (physical entity). The second layer includes a medium access control (MAC) layer (MAC entity), a radio link control (RLC) layer (RLC entity), and a packet data convergence protocol (PDCP) layer (PRCP entity). The third layer includes a radio resource control (RRC) layer (RRC entity).

The physical layer performs coding and decoding, modulation and demodulation, antenna mapping and demapping, and resource mapping and demapping. Data and a control signal are transmitted via a physical channel between a physical layer of the UE 100 and a physical layer of the BS 200.

The MAC layer performs priority control of data, and a retransmission process and the like by hybrid ARQ (HARQ), and a random access procedure, and the like. Data and a control signal are transmitted via a transport channel between a MAC layer of the UE 100 and a MAC layer of the BS 200. The MAC layer of the BS 200 includes a scheduler (MAC scheduler). The scheduler determines a transport format of an uplink and a downlink (a transport block size, a modulation and coding scheme (MCS)) and an allocated resource block to the UE 100.

The RLC layer transmits data to the RLC layer of a reception side using the functions of the MAC layer and the physical layer. Data and a control signal are transmitted via a logical channel between an RLC layer of the UE 100 and an RLC layer of the BS 200.

The PDCP layer executes header compression/decompression and encryption (ciphering)/decryption (deciphering).

The RRC layer is defined only in a control plane handling the control signal. A message (RRC message) for various types of setting is transmitted between an RRC layer of the UE 100 and an RRC layer of the BS 200. The RRC layer controls the logical channel, the transport channel, and the physical channel in response to establishment, re-establishment, and release of a radio bearer. When there is an RRC connection between the RRC of the UE 100 and the RRC of the BS 200, the UE 100 is in RRC connected state. When there is no RRC connection between the RRC of the UE 100 and the RRC of the BS 200, the UE 100 is in RRC_IDLE state.

The non-access stratum (NAS) layer positioned above the RRC layer performs, for example, session management, mobility management.

A service data adaptation protocol (SDAP) provides a 5GC QoS flow. The SDAP executes, for example, mapping between a QoS flow and a data radio bearer.

(Radio Terminal)

Figure 4:
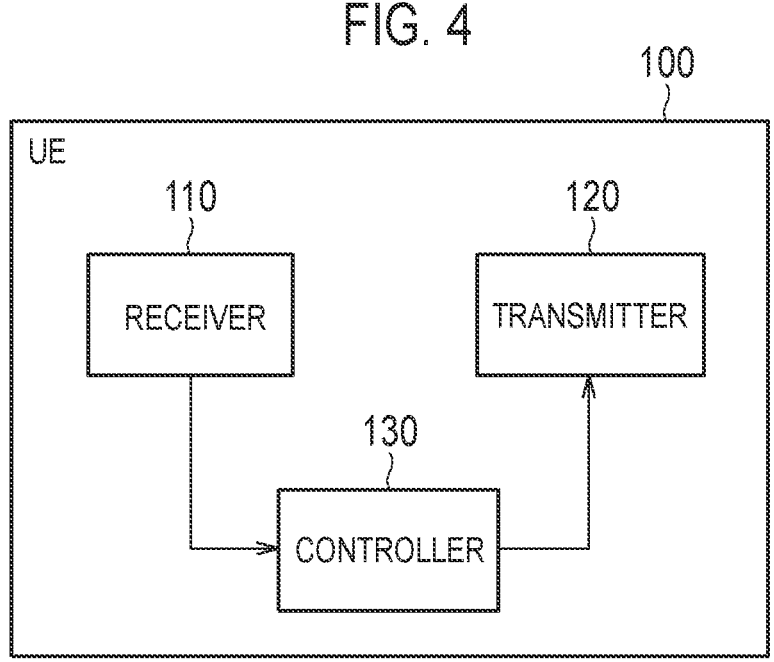
FIG. 4 is a block diagram of an UE 100.

The UE 100 (radio terminal) according to the embodiment will be described. FIG. 4 is a block diagram of the UE 100. As illustrated in FIG. 4, the UE 100 includes a receiver 110, a transmitter 120, and a controller 130. The receiver 110 and the transmitter 120 may be an integrated transceiver.

The receiver 110 performs various types of reception under the control of the controller 130. The receiver 110 includes an antenna. The receiver 110 converts a radio signal received by the antenna into a baseband signal (reception signal). The receiver 110 outputs the baseband signal to the controller 130.

The transmitter 120 performs various types of transmission under the control of the controller 130. The transmitter 120 includes an antenna. The transmitter 120 converts a baseband signal (transmission signal) output from the controller 130 into a radio signal. The transmitter 130 transmits the radio signal from the antenna.

The controller 130 performs various types of control in the UE 100. The controller 130 includes a processor and a memory. The memory stores a program to be executed by the processor and information used for processing performed by the processor. The processor includes a baseband processor and a central processing unit (CPU). The baseband processor performs, for example, modulation/demodulation and coding/decoding of the baseband signal. The CPU performs various processes by executing programs stored in the memory. The processor may include a codec to perform coding/decoding of audio/video signals. The processor executes various processes to be described later and various communication protocols described above.

The UE 100 may include a global navigation satellite system (GNSS) receiver. The GNSS receiver can receive a GNSS signal to obtain position information indicating a geographical position of the UE 100. The GNSS receiver outputs a GNSS signal to the controller 130. The UE 100 may have a global positioning system (GPS) function configured to acquire the position information of the UE 100.

In the present specification, a process performed by at least one of the receiver 110, the transmitter 120, and the controller 130 provided in the UE 100 will be described as a process (operation) performed by the UE 100 for the sake of convenience.

(Base Station)

Figure 5:
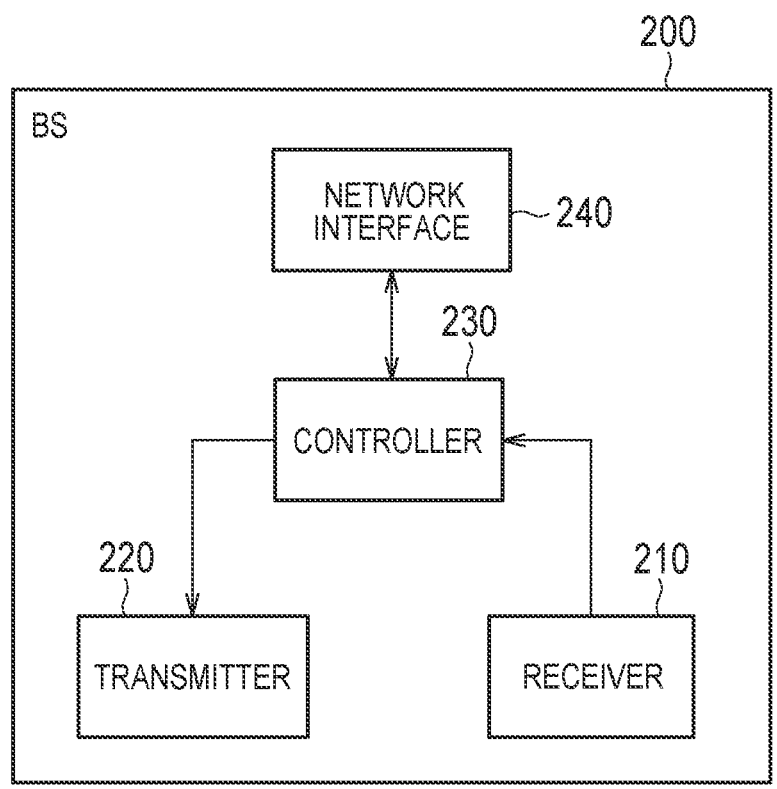
FIG. 5 is a block diagram of a BS 200.

The BS 200 (base station) according to the embodiment will be described. FIG. 5 is a block diagram of the BS 200. As illustrated in FIG. 5, the BS 200 includes a receiver 210, a transmitter 220, a controller 230, and a network interface 240. The transmitter 220 and the receiver 210 may be an integrated transceiver.

The receiver 210 performs various types of reception under the control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various types of transmission under the control of the controller 230. The transmitter 220 includes an antenna. The transmitter 220 converts a baseband signal (transmission signal) output from the controller 230 into a radio signal. The transmitter 220 transmits the radio signal from the antenna.

The controller 230 performs various types of control in the BS 200. The controller 230 includes a processor and a memory. The memory stores a program to be executed by the processor and information used for processing performed by the processor. The processor includes a baseband processor and a CPU. The baseband processor performs, for example, modulation/demodulation, coding/decoding, and the like of the baseband signal. The CPU performs various processes by executing programs stored in the memory. The processor executes various processes to be described later and various communication protocols described above.

The network interface 240 may be connected to the adjacent BS 200 via a predetermined interface (for example, an X2 interface or an Xn interface). The network interface 240 may be connected to the network apparatus 300 via a predetermined interface (for example, an S1 interface, an NG interface, or the like). The network interface 240 may be used for communication with the BS 200 and/or the network apparatus 300 via a predetermined interface, for example.

In the present specification, a process performed by at least one of the receiver 210, the transmitter 220, the controller 230, and the network interface 240 provided in the BS 200 will be described as a process (operation) performed by the BS 200 for the sake of convenience.

(RLC Entity)

Figure 6:
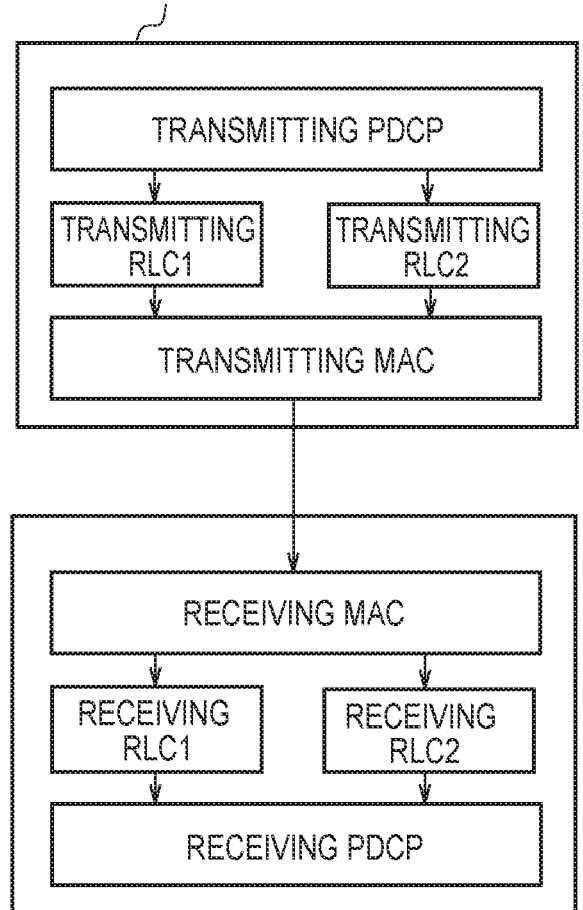
FIG. 6 is a diagram for mainly describing an RLC entity.

The RLC entity will be described with reference to FIG. 6. FIG. 6 is a diagram for mainly describing the RLC entity.

As illustrated in FIG. 6, the radio communication apparatus according to the present embodiment has first RLC entities, second RLC entities, and PDCP entities. In other words, the radio communication apparatus on the transmission side includes a first transmitting RLC entity (hereinafter, a transmitting RLC1), a second transmitting RLC entity (hereinafter, a transmitting RLC2), and a transmitting PDCP entity (hereinafter, a transmitting PDCP). In addition, the radio communication apparatus on the reception side includes a first receiving RLC entity (hereinafter, a receiving RLC1), a second receiving RLC entity (hereinafter, a receiving RLC2), and a receiving PDCP entity (hereinafter, a receiving PDCP). Note that entities (physical entities and the like) other than the RLC entity, the PDCP entity, and the MAC entity are omitted.

The first RLC entities (transmitting RLC1 and receiving RLC1) are primary RLC entities (Primary Legs). The first RLC entity triggers a radio link failure (RLF) based on the number of packet retransmissions reaching a threshold. When the radio link failure is triggered, the RLC re-establishment procedure is performed. In the RLC re-establishment procedure, set values (state variables, a timer, and the like) are reset or initialized so that a specific packet is discarded. When the number of packet retransmissions reaches the threshold, the first RLC entity may report such a fact to a higher layer (for example, the RRC entity).

The radio link failure may be triggered in at least one of the transmitting RLC1 and the receiving RLC1.

The second RLC entities (the transmitting RLC2 and the receiving RLC2) are additional RLC entities. When the number of packet retransmissions reaches the threshold, the second RLC entity reports such a fact to a higher layer (for example, the RRC entity). The second RLC entity does not trigger the radio link failure even when the number of packet retransmissions reaches the threshold.

In FIG. 6, information (a packet) is transmitted from the radio communication apparatus on the transmission side to the radio communication apparatus on the reception side via a radio space. The radio communication apparatus on the transmission side may be the BS 200, and the radio communication apparatus on the reception side may be the UE 100. The radio communication apparatus on the transmission side may be the UE 100, and the radio communication apparatus on the reception side may be the BS 200. The radio communication apparatus on the transmission side may be the UE 100, and the radio communication apparatus on the reception side may be the UE 100.

The transmitting PDCP sends the same packet to both the transmitting RLC1 and the transmitting RLC2 via a logical channel (LCH). The transmitting RLC1 sends a packet to the receiving RLC1 via a lower entity on the transmission side, the radio space, and a lower entity on the reception side (the MAC entity or the physical entity). The transmitting RLC2 sends a packet to the receiving RLC2 via the lower entity on the transmission side, the radio space, and the lower entity on the reception side. Each of the receiving RLC1 and the receiving RLC2 sends a packet to the receiving PDCP. The receiving PDCP receives the same packet from both the receiving RLC1 and the receiving RLC2.

More specifically, as illustrated in FIG. 6, the transmitting PDCP sends the same packet to both the transmitting RLC1 and the transmitting RLC2. Each of the transmitting RLC1 and the transmitting RLC2 sends a packet to one transmitting MAC entity (transmitting MAC). The transmitting MAC transmits the packet received from the transmitting RLC1 and the packet received from the transmitting RLC2 to one receiving MAC entity (receiving MAC). The receiving MAC sends the packet received from the transmitting RLC1 to the receiving RLC1, and sends the packet received from the transmitting RLC2 to the receiving RLC2. Each of the receiving RLC1 and the receiving RLC2 receives the packet from one receiving MAC. Each of the receiving RLC1 and the receiving RLC2 sends the packet to one receiving PDCP.

Note that, as another embodiment, each of the transmitting MAC entity and the receiving MAC entity may be constituted by two MAC entities, that is, a first transmitting MAC entity (transmitting MAC1) and a second transmitting MAC entity (transmitting MAC2), and a first receiving MAC entity (receiving MAC1) and a second receiving MAC entity (receiving MAC2). In such a case, the transmitting RLC1 sends a packet to the transmitting MAC1, and the transmitting RLC2 sends a packet to the transmitting MAC2. The transmitting MAC1 sends the packet received from the transmitting RLC1 to the receiving MAC1, and the transmitting MAC2 sends the packet received from the transmitting RLC2 to the receiving MAC2. The receiving MAC1 sends the packet received from the transmitting MAC1 to the receiving RLC1, and the receiving MAC2 sends the packet received from the transmitting MAC2 to the receiving RLC2. Each of the receiving RLC1 and the receiving RLC2 sends the packet to one receiving PDCP.

Operation According to Embodiment

The operation according to the embodiment will be described using Operation Examples 1 to 3 as examples.

Operation Example 1

Figure 7:
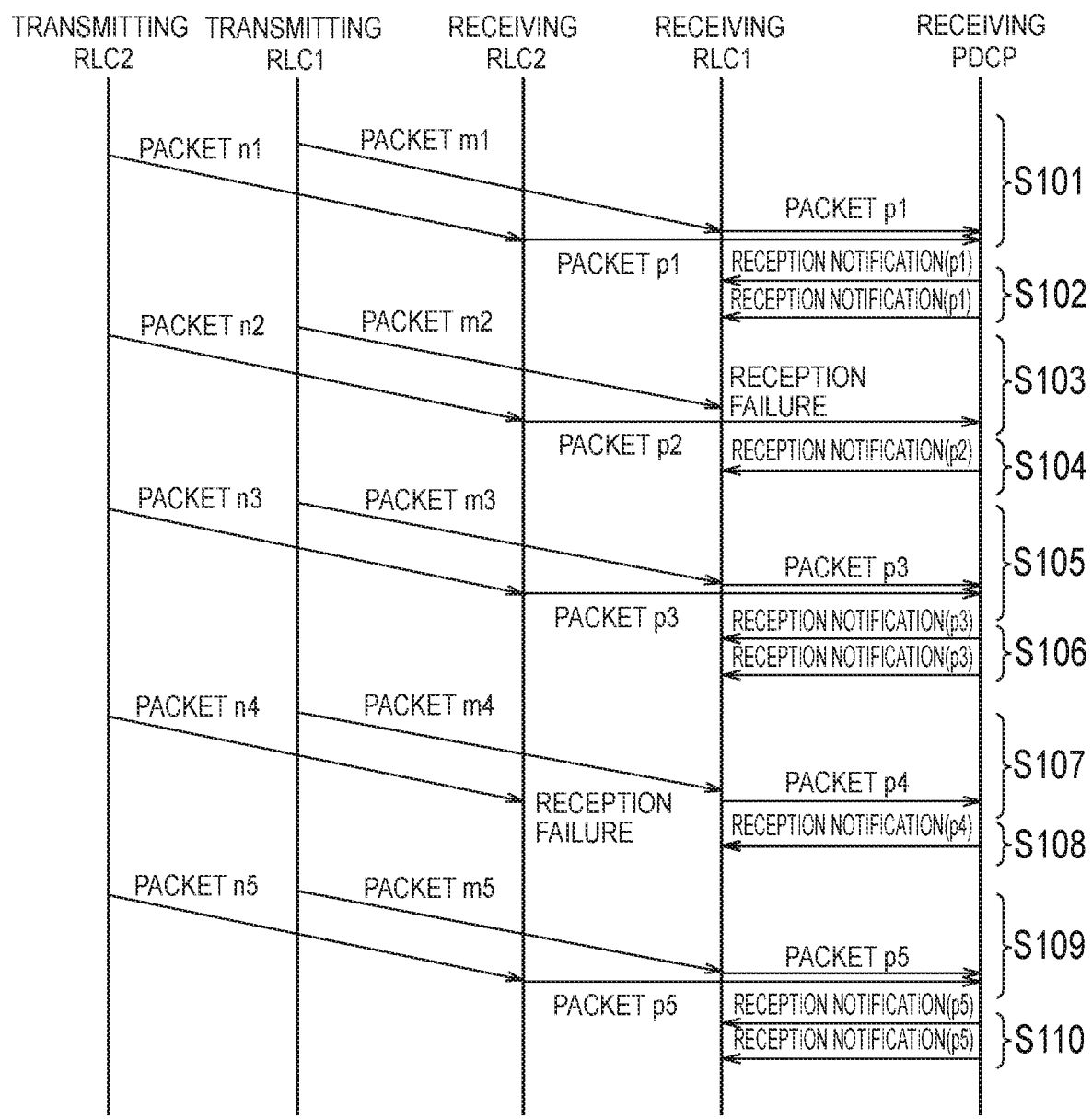
FIG. 7 is a sequence diagram for describing Operation Example 1.
Figure 8:
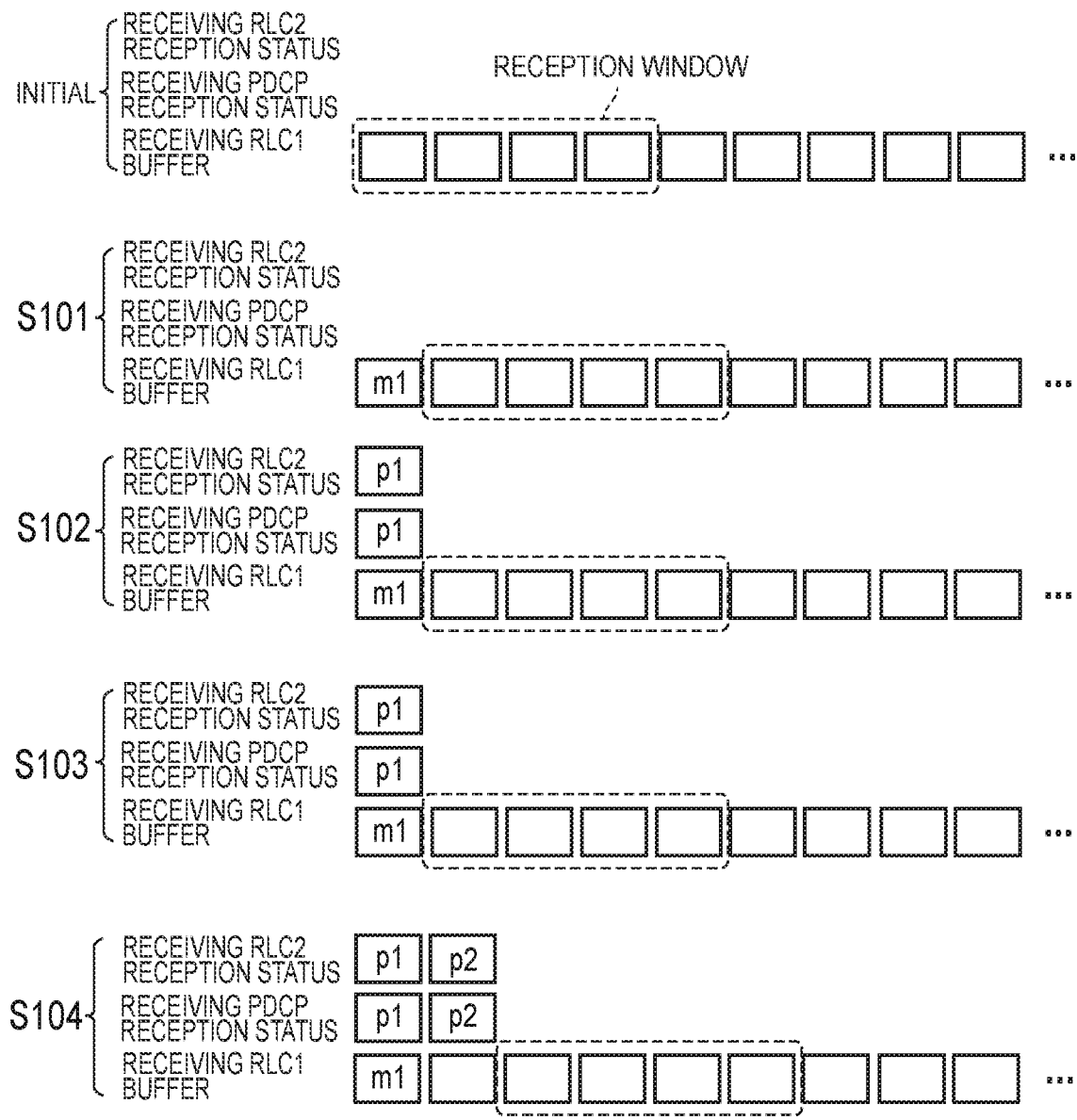
FIG. 8 is a diagram for describing Operation Example 1.
Figure 9:
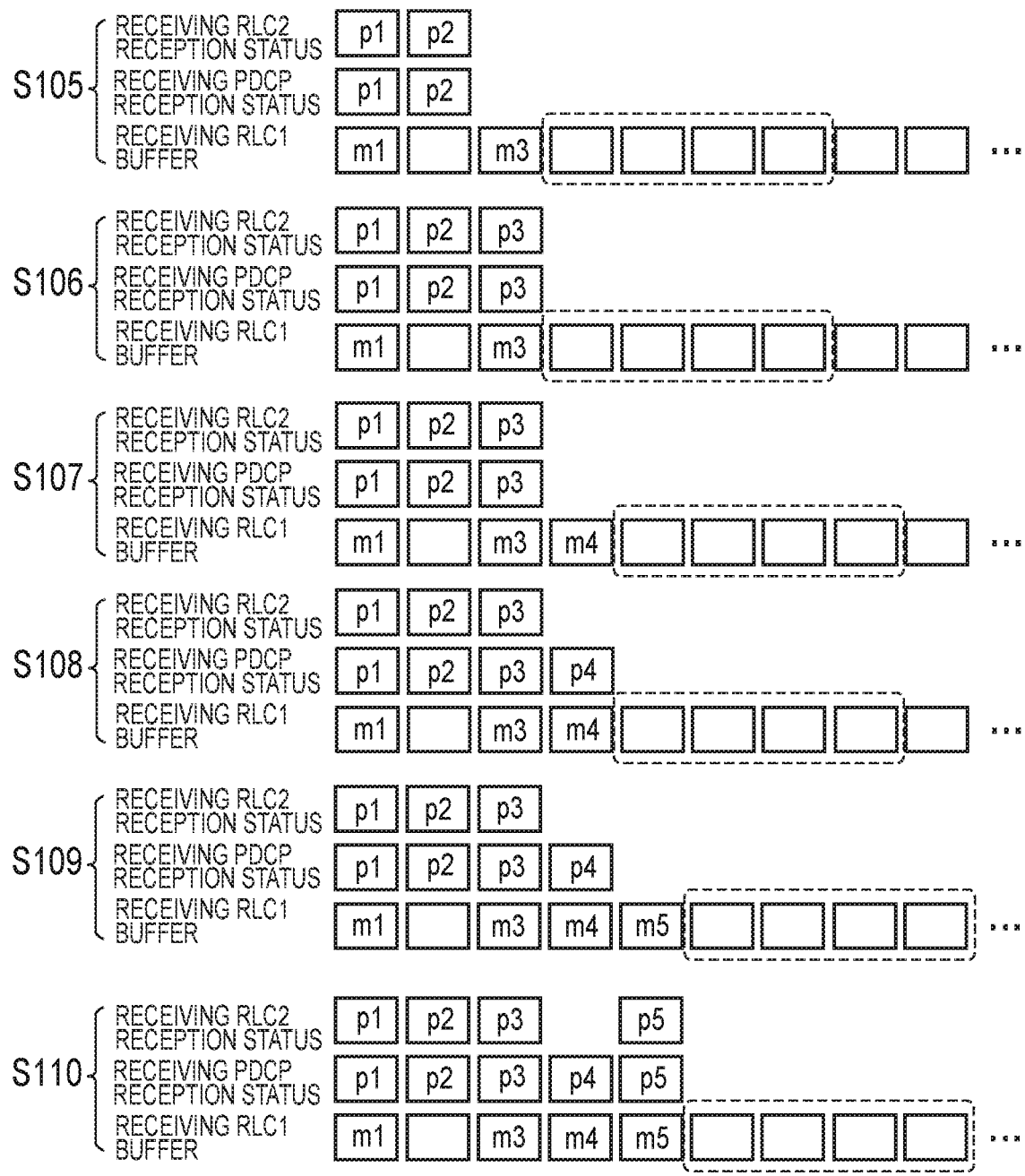
FIG. 9 is a diagram for describing Operation Example 1.

Operation Example 1 will be described with reference to FIGS. 7 to 9. FIG. 7 is a sequence diagram for describing Operation Example 1. FIGS. 8 and 9 are diagrams for describing Operation Example 1.

Prior to Step S101 in FIG. 7, the transmitting PDCP sends the same packet (PDCP protocol data unit (PDU)) to each of the transmitting RLC1 and the transmitting RLC2.

The transmitting RLC1 performs segmentation, concatenation, and insertion of an RLC header on the packet (PDCP PDU/RLC service data unit (SDU)) received from the transmitting PDCP, thereby generating a packet m1 (RLC PDU). Similarly, the transmitting RLC2 performs segmentation, concatenation, and insertion of an RLC header on the packet received from the transmitting PDCP, thereby generating a packet n1.

In Step S101, the transmitting RLC1 sends the packet m1 to the receiving RLC1. The receiving RLC1 receives the packet m1 from the transmitting RLC1. The receiving RLC1 removes the RLC header from the packet m1 and assembles the segmented packets, thereby generating a packet p1 (RLC SDU or PDCP PDU). The receiving RLC1 sends the packet p1 to the receiving PDCP.

The receiving RLC1 grasps from the RLC header that an RLC sequence number of the packet m1 is m1. As illustrated in FIG. 8, the receiving RLC1 stores the RLC sequence number of the packet m1 as m1. The receiving RLC1 shifts a reception window, configured to process packets within a predetermined range, by one packet.

Note that the receiving RLC1 does not monitor a PDCP sequence number (SN) of the packet p1, and thus does not know the PDCP sequence number of the packet p1 in Operation Example 1

Similarly, the transmitting RLC2 sends the packet n1 to the receiving RLC2. The receiving RLC2 receives the packet n1 from the transmitting RLC2. The receiving RLC2 removes the RLC header from the packet n1 and assembles the segmented packets, thereby generating the packet p1. The receiving RLC2 sends the packet p1 to the receiving PDCP.

The receiving RLC1 may transmit packet acknowledgement information (acknowledgement (ACK)/no acknowledgement (NACK)) to the transmitting RLC1. The receiving RLC1 may transmit the packet acknowledgement information when receiving an acknowledgement request from the transmitting RLC1. The same also applies to the receiving RLC2. In the following description, the receiving RLC1 and the receiving RLC2 may execute transmission of the packet acknowledgement information.

In Step S102, the receiving PDCP sends a reception notification, which is information indicating a packet reception status at the receiving PDCP, to the receiving RLC1. In Operation Example 1, the receiving PDCP sends the reception notification to the receiving RLC1 whenever a packet is received from each of the receiving RLC1 and the receiving RLC2.

The reception notification indicates, for example, a PDCP sequence number of a packet received by the receiving PDCP. The reception notification may include identification information to identify a transmission source (the receiving RLC1 or the receiving RLC2) of the received packet. As a result, the receiving RLC1 can determine whether the received reception notification is a reception notification for the packet transmitted by the receiving RLC1 or a reception notification for the packet transmitted by the receiving RLC2 based on the identification information included in the reception notification.

The receiving PDCP may send a reception notification to the receiving RLC1 at a timing in response to packet reception. As a result, when receiving a reception notification at a timing in response to its own packet transmission, it is possible to determine that the reception notification is a reception notification for the packet transmitted from the receiving RLC1 to the receiving PDCP. When the receiving RLC1 has not transmitted a packet but received a reception notification from the receiving PDCP, it is possible to determine that the reception notification is a reception notification for the packet transmitted from the receiving RLC2 to the receiving PDCP.

Here, the receiving PDCP transmits a first reception notification to the receiving RLC1 in response to reception of the packet p1 from the receiving RLC1, and transmits a second reception notification to the receiving RLC1 in response to reception of the packet p1 from the receiving RLC2.

The receiving RLC1 receives the first and second reception notifications where the PDCP sequence number is p1.

The receiving RLC1 can grasp that the PDCP sequence number corresponding to the RLC sequence number (m1) is p1 based on the first reception notification corresponding to the packet transmitted by itself. The receiving RLC1 may store an association between the PDCP sequence number (p1) and the RLC sequence number (m1) in a list (see S102 in FIG. 8). Further, the receiving RLC1 can grasp that the receiving RLC2 has also received the packet corresponding to p1 based on the second reception notification corresponding to the packet transmitted by the receiving RLC2. The receiving RLC1 may store, in the list, the fact that the receiving RLC2 has received the packet corresponding to the PDCP sequence number (p1) (see S102 in FIG. 8).

In the following description, the same operation as those described above will not be described.

In Step S103, the transmitting RLC1 sends a packet m2 to the receiving RLC1 due to a problem such as radio failure and an increase in processing load of the UE 100. The receiving RLC1 fails to receive the packet m2. The failure in the reception of the packet m2 may mean, for example, that extraction of the packet m2 from data transmitted from a lower entity has failed in the receiving RLC1. In this case, it is difficult for the receiving RLC1 to generate a packet p2 from the packet m2. The transmitting RLC2 sends a packet n2 to the receiving RLC2. The receiving RLC2 receives the packet n2. The receiving RLC2 generates the packet p2 from the packet n2. The receiving RLC2 sends the packet p2 to the receiving PDCP.

In Step S104, the receiving PDCP sends a reception notification to the receiving RLC1 in response to reception of the packet p2 from the receiving RLC2.

The receiving RLC1 can grasp that the receiving RLC2 has received the packet p2 by receiving the reception notification. The receiving RLC1 considers the packet m2 (or packet n2) that has not been received from the transmitting RLC1 as a received packet based on the reception notification. As a result, the receiving RLC1 shifts the reception window by one packet (see S104 in FIG. 8).

Steps S105 and S106 are the same as Steps S101 and S102.

The receiving RLC1 shifts the reception window by one packet by receiving a packet m3 (see S105 in FIG. 9).

In Step S106, the receiving PDCP transmits a first reception notification to the receiving RLC1 in response to reception of a packet p3 from the receiving RLC1. In addition, receiving PDCP transmits a second reception notification to receiving RLC1 in response to the reception of the packet p3 from the receiving RLC2. The receiving RLC1 can grasp the PDCP sequence number (p3) corresponding to the RLC sequence number (m3) by receiving the first reception notification. The receiving RLC1 can grasp that the receiving RLC2 has received the packet p3 by receiving the second reception notification (see S106 in FIG. 9).

In Step S107, the transmitting RLC1 sends a packet m4 to the receiving RLC1. The receiving RLC1 receives the packet m4. The receiving RLC1 generates a packet p4 from the packet m4. The receiving RLC1 sends the packet p4 to the receiving PDCP. On the other hand, the transmitting RLC2 transmits a packet n4 to the receiving RLC2. The receiving RLC2 fails to receive the packet n4 due to a problem such as radio failure and an increase in processing load of the UE 100.

The receiving RLC1 shifts the reception window by one packet by receiving the packet m4 (see S107 in FIG. 9).

In Step S108, the receiving PDCP sends a reception notification to the receiving RLC1 in response to reception of the packet p4 from the receiving RLC1.

The receiving RLC1 can grasp the PDCP sequence number (p4) corresponding to the RLC sequence number (m4) based on the reception notification (see S108 in FIG. 9).

Steps S109 and S110 are the same as Steps S101 and S102.

Since the receiving RLC1 has not received the reception notification (p4) for the packet transmitted by the receiving RLC2, it is possible to grasp that the receiving RLC2 has not received the packet corresponding to p2.

As described above, the receiving PDCP sends the reception notification, which is the information indicating the packet reception status at the receiving PDCP, to the receiving RLC1. Specifically, the receiving PDCP sends the reception notification to the receiving RLC1 whenever a packet is received from each of the receiving RLC1 and the receiving RLC2. As a result, the receiving RLC1 can grasp that the receiving PDCP has received the packet via the receiving RLC2 even when no packet can be received from the transmitting RLC1. For this reason, even when the number of packet retransmissions reaches the threshold, the radio link failure can be prevented from being triggered when the receiving PDCP receives the packet.

Operation Example 2

Figure 10:
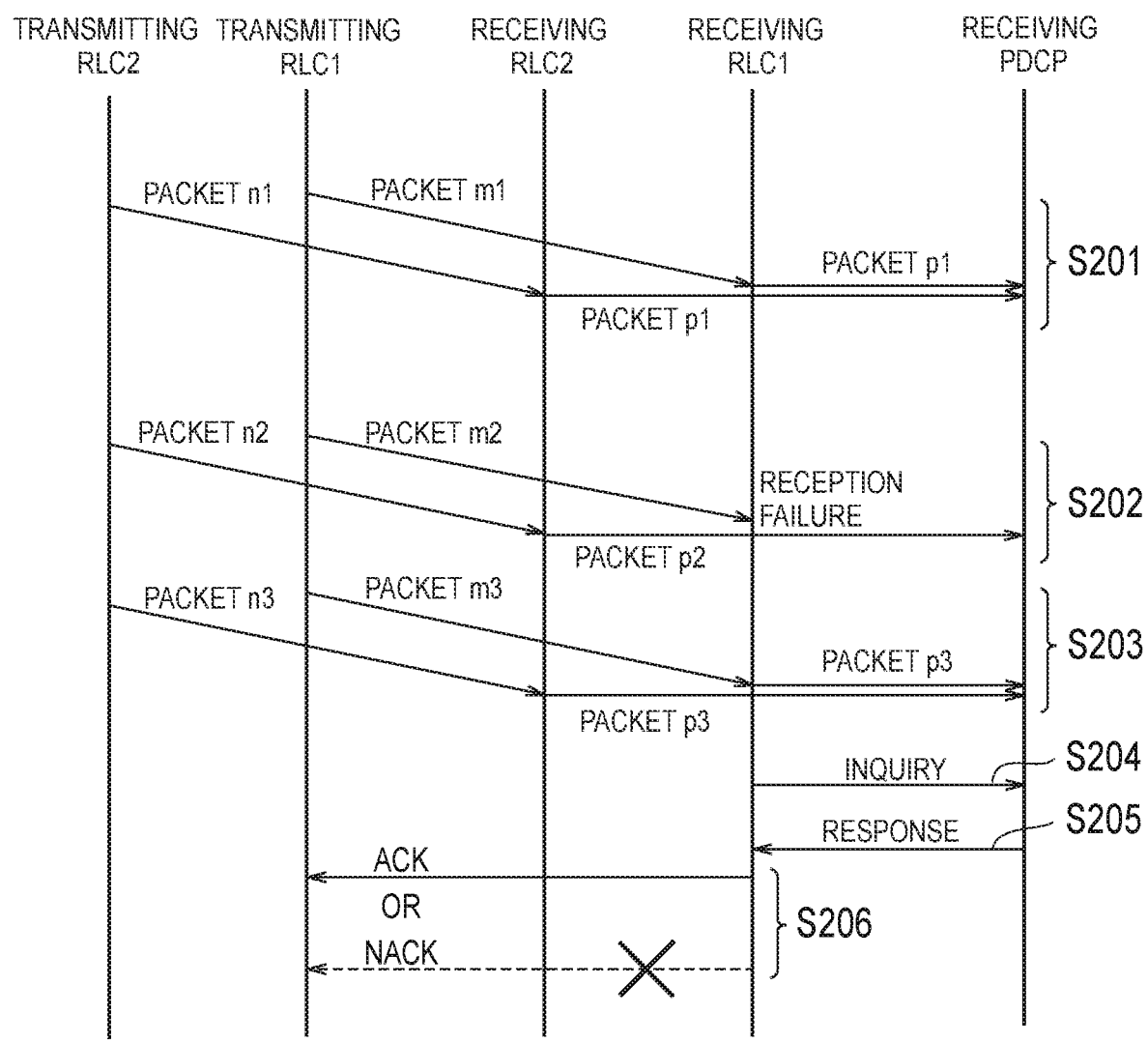
FIG. 10 is a sequence diagram for describing Operation Example 2.
Figure 11:
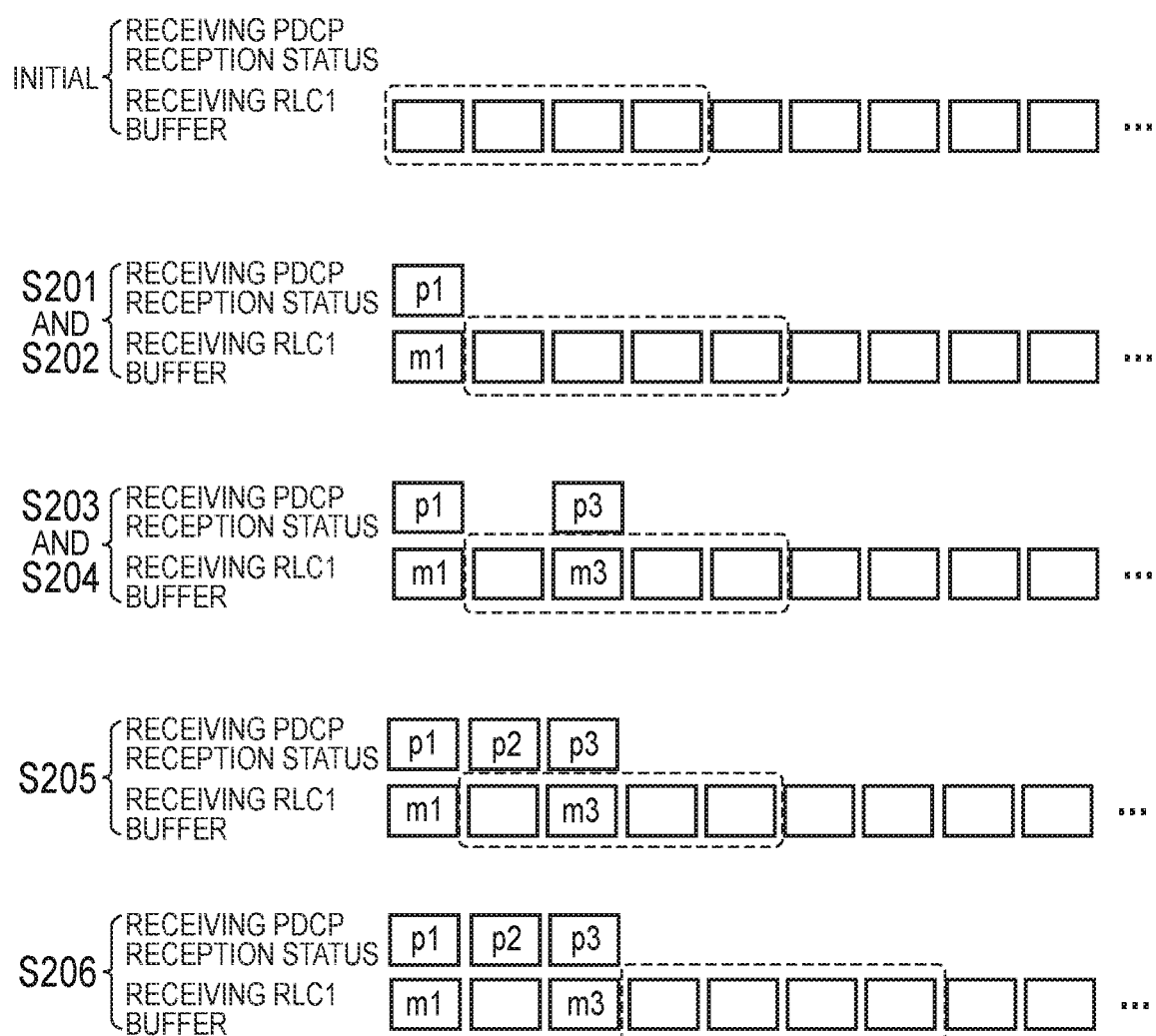
FIG. 11 is a diagram for describing Operation Example 2.

Operation Example 2 will be described with reference to FIGS. 10 and 11. FIG. 10 is a sequence diagram for describing Operation Example 2. FIG. 11 is a diagram for describing Operation Example 2. The same operation as those described above will not be described.

In Operation Example 2, the receiving RLC1 inquires of the receiving PDCP about a packet reception status.

In FIG. 10, Steps S201 to S203 correspond to Steps S101, S103, and S105.

In Operation Example 2, the receiving RLC1 monitors a PDCP sequence number (SN) from a packet m1. Specifically, the receiving RLC1 monitors a PDCP sequence number of a packet p1 at the time of generating the packet p1 from the packet m1. As a result, the receiving RLC1 can grasp an association between the PDCP sequence number (p1) and an RLC sequence number (m1). The receiving RLC1 may be stored in a list of the association between the PDCP sequence number (p1) and the RLC sequence number (m1) (see S201 in FIG. 11). In this manner, the receiving RLC1 may synchronize the PDCP sequence number with the RLC sequence number.

In Step S204, the receiving RLC1 inquires of the receiving PDCP about a packet reception status.

The receiving RLC1 may inquire the packet reception status, for example, when it is difficult to move (shift) the reception window since there is a packet that has not been received even though the packet (m3) has been received (see S204 in FIG. 11). When it is difficult to move the reception window for a predetermined period after receiving the packet m3, the receiving RLC1 may inquiry about the packet reception status.

When receiving an acknowledgement request from the transmitting RLC, the receiving RLC1 may inquire of the receiving PDCP about the packet reception status.

The receiving RLC1 may inquire of the receiving PDCP about the packet reception status before the number of packet retransmissions (or the number of packet retransmission requests with respect to the transmitting RLC1, which is similarly applied hereinafter) reaches the threshold. The receiving RLC1 may inquire of the receiving PDCP about the packet reception status in response to the number of packet retransmissions reaching the threshold. As a result, the receiving RLC1 can know the packet reception status of the receiving PDCP before the radio link failure is triggered by the number of packet retransmissions reaching the threshold, and thus, the radio link failure can be prevented from being unnecessarily triggered.

The receiving RLC1 may grasp the number of packet retransmissions based on the number of times that packet reception has failed. The receiving RLC1 may consider "the number of times that packet reception has failed−1" as the number of packet retransmissions. The receiving RLC1 may consider the number of acknowledgement status inquiries from the transmitting RLC1 as the number of packet retransmissions. The receiving RLC1 may consider the number of transmissions of NACK indicating packet reception failure as the number of packet retransmissions.

The receiving RLC1 may be notified of the current number of retransmissions from the transmitting RLC1. Specifically, the transmitting RLC1 may transmit information indicating the current number of retransmissions to the receiving RLC1. The information indicating the current number of retransmissions (retransmission count information) may be stored in a header of a packet (RLC PDU). The retransmission count information may be stored in a packet (for example, a control PDU). The receiving RLC1 may grasp the number of packet retransmissions based on the retransmission count information.

The information transmitted when the receiving RLC1 makes an inquiry may be information (p2) indicating a PDCP sequence number of a packet that has not been received by the receiving RLC1. The information may be information (p3) indicating a PDCP sequence number of a packet that has been received by the receiving RLC1. The information may be information (p1, p3) indicating a series of a plurality of PDCP sequence numbers that have been received by the receiving RLC1.

In Step S205, the receiving PDCP sends information (a response) indicating the packet reception status at the receiving PDCP to the receiving RLC1 in response to the reception of the inquiry from the receiving RLC1.

The response may include the information (p2) indicating the PDCP sequence number of the packet that has not been received from the receiving RLC1 among the packets that have been received by PDCP. The response may include information (p4) indicating a PDCP sequence number that has not been received from any of the receiving RLC1 and the receiving RLC2. The response may include information (p1, p2, p3) indicating a series of received PDCP sequence numbers.

The receiving RLC1 grasps whether or not a packet that has not been received by the receiving RLC1 has arrived at the receiving PDCP based on the response from the receiving PDCP. In this operation example, the packet p2 is sent from the receiving RLC2 to the receiving PDCP. For this reason, the receiving RLC1 can grasp that the receiving PDCP has received the packet p2 via the receiving RLC2 based on the information included in the response from the receiving PDCP (S205 in FIG. 11).

In Step S206, the receiving RLC1 can execute processing related to the transmission of acknowledgement information (ACK or NACK) based on the information (response) indicating the packet reception status.

For example, the receiving RLC1 may send information (ACK) indicating that the packet m2 has been received to the transmitting RLC1 as the acknowledgement information for the predetermined packet m2 that has not been received from the transmitting RLC1 based on the information included in the response from the receiving PDCP.

The receiving RLC1 may stop sending information (NACK) indicating that the packet m2 has not been received to the transmitting RLC1 as the acknowledgement information for the predetermined packet m2 that has not been received from the transmitting RLC1 based on the response from the receiving PDCP.

As a result, the transmitting RLC1 can determine that the packet m2 has arrived at the receiving RLC1. As a result, the transmitting RLC1 stops the retransmission of the packet m2 before the number of packet retransmissions reaches the threshold, and thus, the radio link failure can be prevented from being triggered.

As described above, the receiving RLC1 inquires of the receiving PDCP of the packet reception status. The receiving PDCP sends information (a response) indicating the packet reception status at the receiving PDCP to the receiving RLC1 in response to the reception of the inquiry from the receiving RLC1. As a result, the receiving PDCP sends the information indicating the packet reception status to the receiving RLC1 in response to the reception of the inquiry from the receiving RLC1, and thus, the processing load can be reduced.

Operation Example 3

Figure 12:
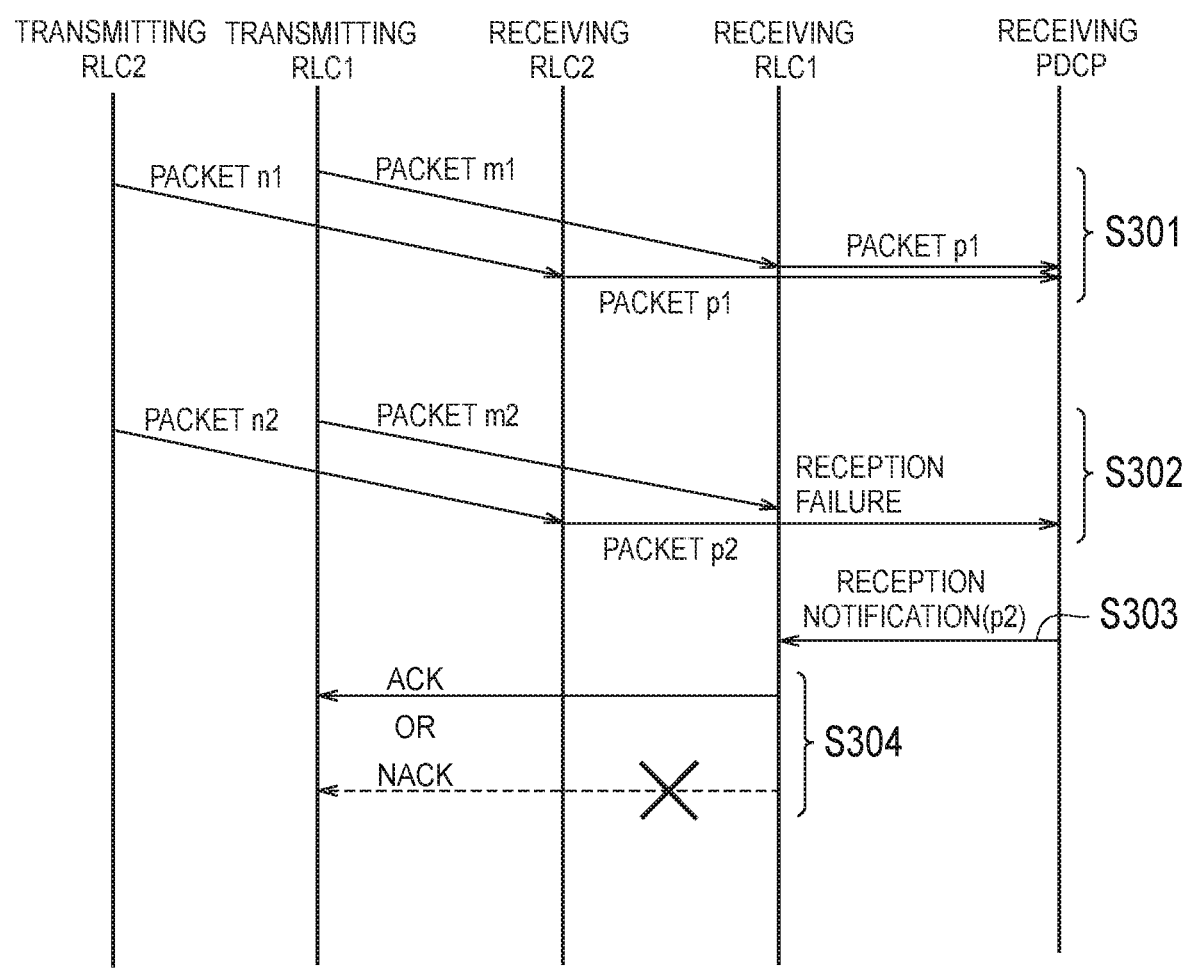
FIG. 12 is a sequence diagram for describing Operation Example 3.
Figure 13:
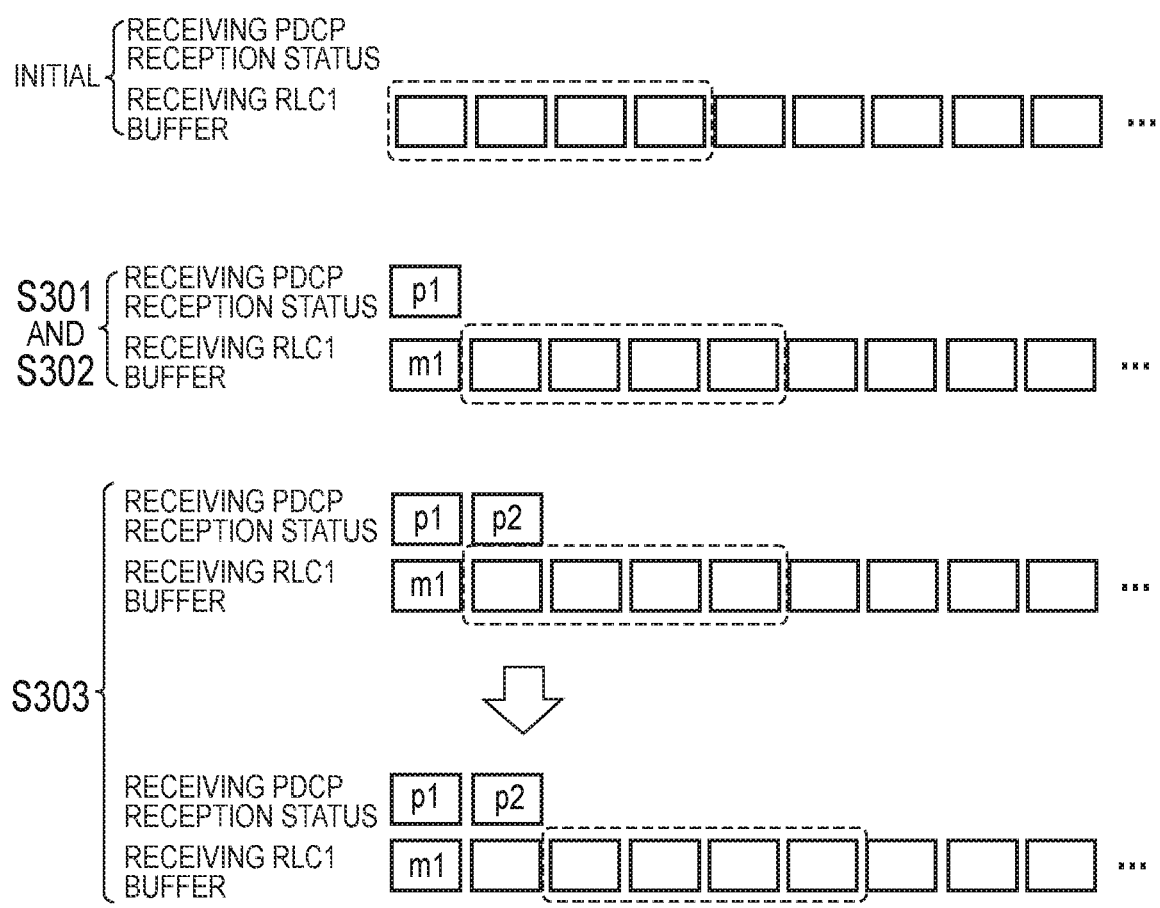
FIG. 13 is a diagram for describing Operation Example 3.

Operation Example 3 will be described with reference to FIGS. 12 and 13. FIG. 12 is a sequence diagram for describing Operation Example 3. FIG. 13 is a diagram for describing Operation Example 3. The same operation as those described above will not be described.

In Operation Example 3, the receiving PDCP sends a reception notification to the receiving RLC1 in response to reception of a packet, which has not been received from the receiving RLC1, from the receiving RLC2.

In FIG. 12, Steps S301 and S302 correspond to Steps S101 and S103.

The receiving RLC1 may grasp an association between a PDCP sequence number and an RLC sequence number by monitoring the PDCP sequence number (SN) from a packet m1 (see S302 in FIG. 13), which is similar to Operation Example 2.

The receiving PDCP manages the PDCP sequence number of the packet received from the receiving RLC1. Whenever a packet is received from the receiving RLC2, the receiving PDCP determines whether the received packet is a packet that has been already received from the receiving RLC1. When the received packet is the packet that has been already received from the receiving RLC1, the receiving PDCP ends the processing. On the other hand, when the received packet is a packet that has not been received from the receiving RLC1, the receiving PDCP executes the process of Step S303. In addition, the receiving PDCP may execute the process of Step S303 when the packet received from the receiving RLC2 is the packet that has not been received from the receiving RLC1 and the same packet is not received from the receiving RLC1 even after a predetermined time has elapsed since the reception of the packet from the receiving RLC2.

In Step S303, the receiving PDCP sends a reception notification to the receiving RLC1 in response to reception of the packet, which has not been received from the receiving RLC1, from the receiving RLC2.

Firstly, the receiving PDCP may send a reception notification including information (p2), which indicates a PDCP sequence number of a packet that has not been received from the receiving RLC1 among the packets received from the receiving RLC2, to the receiving RLC1.

The receiving RLC1 can grasp that the receiving PDCP has received the packet p2 from the receiving RLC2 based on the reception notification including the information indicating the PDCP sequence number. The receiving RLC1 grasps the association between the PDCP sequence number and the RLC sequence number, and thus, can grasp the RLC sequence number corresponding to the PDCP sequence number based on the PDCP sequence number received from the receiving PDCP. The receiving RLC1 shifts the reception window by one packet based on the reception notification (see S303 in FIG. 13).

Even in a case where there are a plurality of packets that have not been received from the receiving RLC1, the reception notification includes information (for example, px, py, . . . , and pz) that indicates PDCP sequence numbers of packets that have not been received, and thus, the receiving RLC1 can grasp that the receiving PDCP has received a plurality of packets (px, py, . . . , and pz) via the receiving RLC2 based on the reception notification.

Secondly, the receiving PDCP may send a reception notification to the receiving RLC1 in response to reception of a packet with the oldest PDCP sequence number from the receiving RLC2 among the packets that have not been received from the receiving RLC1. The reception notification indicates the packet with the oldest PDCP sequence number among the packets that have not been received from the receiving RLC1.

Here, the "packet with the oldest PDCP sequence number" is a packet with the smallest PDCP sequence number when no wraparound of the sequence number has occurred. When the unreceived packets include a packet with the largest PDCP sequence number that causes the wraparound, the "packet with the oldest PDCP sequence number" is a packet with the smallest PDCP sequence number among packets with PDCP sequence numbers closer to the largest PDCP sequence number than the smallest PDCP sequence number.

The receiving RLC1 that performs the packet rearrangement grasps a packet with the oldest RLC sequence number (that is, the packet that hinders the shift of the reception window). For this reason, the receiving RLC1 can grasp that the receiving PDCP has received the packet with the oldest sequence number among the packets that have not been received from the transmitting RLC1 in response to reception of a reception notification even if the reception notification does not include the information indicating the PDCP sequence number. As a result, the receiving RLC1 can shift the reception window by one packet.

In the case where there are the plurality of packets that have not been received from the receiving RLC1, the receiving PDCP sends the reception notification corresponding to the number of the unreceived packets to the receiving RLC1, so that the receiving RLC1 can shift the reception window by the number corresponding to the unreceived packets.

Thirdly, when the receiving RLC1 performs in-sequence delivery, the receiving PDCP may send a reception notification to the receiving RLC1 in response to reception of a packet that has not been received from the receiving RLC1.

The receiving RLC1 performing the in-sequence delivery waits for an unreceived packet without sending a received packet to the receiving PDCP even if receiving a packet with a higher sequence number than the unreceived packet when the unreceived packet with the oldest sequence number exists within the range of the reception window. For this reason, the receiving RLC1 can grasp that the receiving PDCP has received the unreceived packet with the oldest sequence number in response to the reception of the reception notification. As a result, the receiving RLC1 can shift the reception window by one packet. When the packet with the oldest sequence number within the range of the reception window has been received by shifting the reception window, the receiving RLC1 can send the packet to the receiving PDCP.

Step S304 corresponds to Step S206.

As described above, the receiving PDCP sends a reception notification to the receiving RLC1 in response to reception of a packet, which has not been received from the receiving RLC1, from the receiving RLC2. As a result, the receiving PDCP does not need to send the reception notification to the receiving RLC1 whenever a packet is received, and thus, the processing load can be reduced.

Other Embodiments

Although the contents of the present application have been described with reference to the above-described embodiment, it should not be understood that the description and the drawings forming a part of this disclosure limit the contents of the present application. Various alternative embodiments, examples and operational techniques will be apparent to those skilled in the art from this disclosure.

In the above description, the reception notification may include a bitmap configured to determine a packet received by the receiving PDCP. In the bitmap, among packets that have not been received from the receiving RLC1, a packet (1) with the oldest PDCP sequence number may be indicated at the first bit, a packet (2) with the next PDCP sequence number may be indicated at the second bit, . . . , and a packet (n) with the n-th PDCP sequence number may be indicated at the n-th bit. The receiving PDCP may indicate, an unreceived packet by "0" and indicate a received packet by "1", for example, in each bit. The receiving RLC1 performing packet rearrangement grasps a packet with the oldest RLC sequence number. Since the packet with the oldest PDCP sequence number and the packet with the oldest RLC sequence number are associated, the receiving RLC1 can grasp the packet that has been received and the packet that has not been received by the receiving PDCP with reference to the packet with the oldest RLC sequence number among packets that have not been transmitted to the receiving PDCP based on the bitmap.

Although the radio communication apparatus on the reception side has been described as an example in the above description, but the present invention is not limited thereto. For example, in the radio communication apparatus on the transmission side, the transmitting RLC1 may transmit a packet acknowledgement request to the receiving RLC1 so as to indirectly inquire of the receiving PDCP about a packet reception status (see Operation Example 2). For example, the transmitting RLC1 may transmit the acknowledgement request to the receiving RLC1 before the number of packet retransmissions reaches a threshold. The transmitting RLC1 may transmit the acknowledgement request to the receiving RLC1 before triggering radio link failure even if the number of packet retransmissions reaches the threshold. The transmitting RLC1 does not necessarily trigger the radio link failure when receiving ACK from the receiving RLC1 even if the number of packet retransmissions reaches the threshold.

The transmitting RLC1 may transmit an acknowledgement request including retransmission count information indicating that the number of packet retransmissions is the threshold. The transmitting RLC1 does not necessarily trigger the radio link failure when receiving ACK from the receiving RLC1. The transmitting RLC1 does not necessarily trigger the radio link failure when NACK is not received in response to the transmission of the retransmission count information indicating that the number of packet retransmissions is the threshold.

Although the method of controlling the trigger of the radio link failure in the RLC entity has been described in the above description, but the present invention is not limited thereto. For example, a higher layer (for example, the RRC entity) may determine that not radio link failure has occurred when the packet transmission and/or reception is normal at the PDCP entity according to a report from the PDCP entity even if the radio link failure is reported from the RLC entity. Only when receiving both the report of the radio link failure from the RLC entity and the report indicating that the packet transmission and/or reception is abnormal at the PDCP entity, the higher layer may determine that the radio link failure has occurred.

In the above-described embodiment, the UE 100 may be a sensor module (M2M device). The UE 100 may be a radio communication apparatus (for example, the Internet of things gateway (IoT GW)) that manages a (plurality of) sensor module(s). The IoT GW may execute communication with a network on behalf of the sensor module(s) managed by the IoT GW. The sensor module does not necessarily have a function of executing the communication with the network. The sensor module managed by the IoT GW may have a function of executing communication with the IoT GW.

The contents according to the above-described embodiments may be executed in an appropriate combination. In addition, all the operations are not necessarily essential configurations in each of the above-described sequences. For example, only some of the operations may be performed in each of the sequences.

Although not particularly stated in the above-described embodiment, a program, which causes a computer to execute each process performed by any of the above-described respective nodes (the UE 100, the BS 200, the network apparatus 300, and the like) may be provided. The program may be recorded on a computer-readable medium. If the computer-readable medium is used, it is possible to install the program on the computer. Here, the computer-readable medium on which the program has been recorded may be a non-transitory recording medium. The non-transitory recording medium is not particularly limited, and may be, for example, a recording medium such as a CD-ROM and a DVD-ROM.

A chip may be provided, the chip constituted by a memory that stores a program for execution of the respective processes performed by either the UE 100 or the BS 200 and a processor that executes the program stored in the memory.

Although the LTE system has been described as an example of the mobile communication system in the above-described embodiment, the present invention is not limited to the LTE system, and the contents according to the present application may be applied to systems other than the LTE system.

Note that the entire contents of Japanese Patent Application No. 2017-225214 (filed on Nov. 22, 2017) are incorporated herein by reference.

The invention claimed is:

1. A communication method for controlling a first radio communication apparatus and a second radio communication apparatus,
the first radio communication apparatus configured to include:
a first transmitting radio link control (RLC) entity which is a primary RLC entity;
a second transmitting RLC entity which is an additional RLC entity; and
a transmitting packet data convergence protocol (PDCP) entity configured to send an identical packet to both the first transmitting RLC entity and the second transmitting RLC entity,
the second radio communication apparatus configured to include:
a first receiving RLC entity which is a primary RLC entity configured to receive a packet from the first transmitting RLC entity;
a second receiving RLC entity which is an additional RLC entity configured to receive a packet from the second transmitting RLC entity; and
a receiving PDCP entity configured to receive packets from both the first receiving RLC entity which is the primary RLC entity and the second receiving RLC entity which is the additional RLC entity, wherein the communication method comprises:
a step of inquiring of the receiving PDCP entity, by the first receiving RLC entity which is the primary RLC entity, about a packet reception status, and
in response to reception of the inquiry from the first receiving RLC entity, a step of sending, from the receiving PDCP entity to the first receiving RLC entity which is the primary RLC entity, information indicating the packet reception status at the receiving PDCP entity.

2. The communication method according to claim 1, wherein
in the sending, the receiving PDCP entity sends, to the first receiving RLC entity which is the primary RLC entity, the information indicating the reception status every when receiving a packet from each of the first receiving RLC entity which is the primary RLC entity and the second receiving RLC entity which is the additional RLC entity.

3. The communication method according to claim 2, wherein
the information indicating the reception status includes a PDCP sequence number of a received packet.

4. The communication method according to claim 2, wherein
the information indicating the reception status includes identification information to identify a transmission source of the received packet.

5. The communication method according to claim 1, wherein
in the inquiring, the first receiving RLC entity which is the primary RLC entity, inquires of the receiving PDCP entity about the packet reception status before a number of retransmissions in the first transmitting RLC entity reaches a threshold or in response to the number of retransmissions reaching the threshold.

6. The communication method according to claim 1, further comprising the steps of:
monitoring, by the first receiving RLC entity which is the primary RLC entity, a PDCP sequence number from a packet received from the first transmitting RLC entity; and
storing, by the first receiving RLC entity which is the primary RLC entity, the monitored PDCP sequence number and an RLC sequence number of the received packet in association with each other.

7. The communication method according to claim 1, wherein
in the sending, the receiving PDCP entity sends, to the first receiving RLC entity which is the primary RLC entity, the information indicating the reception status in response to reception of a packet from the second receiving RLC entity which is the additional RLC entity, the packet having not been received from the first receiving RLC entity which is the primary RLC entity.

8. The communication method according to claim 1, further comprising
a step of causing the first receiving RLC entity which is the primary RLC entity to consider a packet that has not been received from the first transmitting RLC entity as a received packet based on the information indicating the reception status.

9. The communication method according to claim 1, further comprising
a step of sending, from the first receiving RLC entity which is the primary RLC entity to the first transmitting RLC entity, information indicating reception of a predetermined packet as acknowledgement information for the predetermined packet that has not been received from the first transmitting RLC entity based on the information indicating the reception status.

10. The communication method according to claim 1, further comprising
a step of stopping sending, from the first receiving RLC entity which is the primary RLC entity to the first transmitting RLC entity, information indicating non-reception of a predetermined packet as acknowledgement information for the predetermined packet that has not been received from the first transmitting RLC entity based on the information indicating the reception status.

11. A radio communication apparatus comprising
a controller,
wherein the controller is configured to execute a process of controlling:
a first receiving radio link control (RLC) entity which is a primary RLC entity configured to receive a packet from a first transmitting RLC entity of other radio communication apparatus;
a second receiving RLC entity which is an additional RLC entity configured to receive a packet from a second transmitting RLC entity of the other radio communication apparatus; and
a receiving PDCP entity configured to receive packets from both the first receiving RLC entity which is the primary RLC entity and the second receiving RLC entity which is the additional RLC entity, wherein
the controller is configured to execute processes of
inquiring of the receiving PDCP entity, by the first receiving RLC entity which is the primary RLC entity, about a packet reception status, and
in response to reception of the inquiry from the first receiving RLC entity, sending, from the receiving PDCP entity to the first receiving RLC entity which is the primary RLC entity, information indicating the packet reception status at the receiving PDCP entity.

12. A processor for control of a radio communication apparatus, the processor configured to execute a process of controlling:
a first receiving radio link control (RLC) entity which is a primary RLC entity configured to receive a packet from a first transmitting RLC entity of other radio communication apparatus;
a second receiving RLC entity which is an additional RLC entity configured to receive a packet from a second transmitting RLC entity of the other radio communication apparatus; and
a receiving PDCP entity configured to receive packets from both the first receiving RLC entity which is the primary RLC entity and the second receiving RLC entity which is the additional RLC entity, wherein
the processor configured to execute processes of
inquiring of the receiving PDCP entity, by the first receiving RLC entity which is the primary RLC entity, about a packet reception status, and
in response to reception of the inquiry from the first receiving RLC entity, sending, from the receiving PDCP entity to the first receiving RLC entity which is the primary RLC entity, information indicating the packet reception status at the receiving PDCP entity.

\* \* \* \* \*